Figure 1:
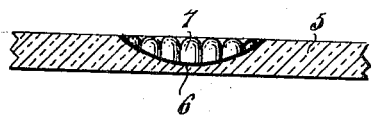

April 29, 1924.

T. SKINNER 1,492,402

METHOD OF ORNAMENTING GLASS ARTICLES

Filed June 10, 1922

Inventor
Thomas Skinner
By F. R. Bryant
Attorney

Patented Apr. 29, 1924.

1,492,402

UNITED STATES PATENT OFFICE.

THOMAS SKINNER, OF HAMMONTON, NEW JERSEY.

METHOD OF ORNAMENTING GLASS ARTICLES.

Application filed June 10, 1922. Serial No. 567,363.

*To all whom it may concern:*

Be it known that I, THOMAS SKINNER, a citizen of the United States of America, residing at Hammonton, in the county of Atlantic and State of New Jersey, have invented certain new and useful Improvements in Methods of Ornamenting Glass Articles, of which the following is a specification.

This invention relates to certain new and useful methods of ornamenting glass articles, and has for its principal object to provide novel, ornamental, and decorative effects in transparent or partially transparent decorative particles, beads or jewels secured on a glass body and permanently united to the surface of the article.

Another object of the invention is to so apply the glass jewels to the article and to provide the jewels and the outer surface of the article flush whereby dislodgment of the jewels is rendered unlikely and a uniform decorated structure is had.

Another object of the invention is to provide recesses in the surface of the glassware of such form as to enable the use of jewels of varying sizes for obtaining the desired effects, without allowing projection of the jewels beyond the outer surface of the glassware.

With these general objects in view and others that will appear as the nature of the invention is better understood, the same consists in the novel construction, combination and arrangement of parts hereinafter more fully described, illustrated in the accompanying drawings, and pointed out in the appended claims.

Figure 2:
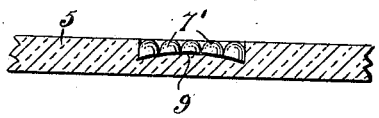
Figure 3:
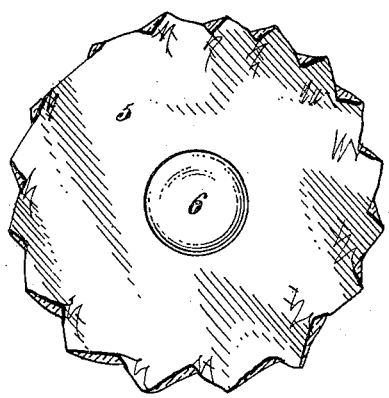
Figure 4:
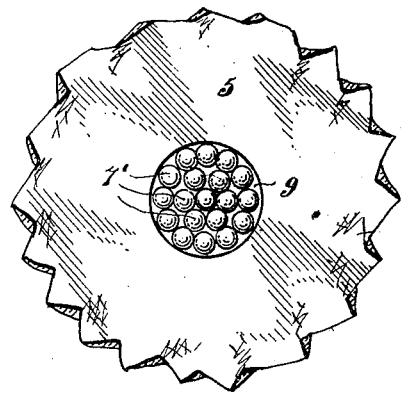
Figure 7:
Figure 6:
Figures 5, 8:
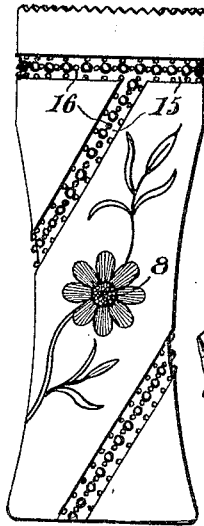
Figure 9:
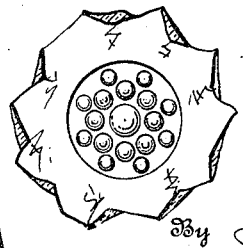
Figure 10:

In the drawings forming a part of this application and in which like designating characters refer to corresponding parts throughout the several views:

Fig. 1 is an enlarged fragmentary sectional view showing a portion of an article of glassware ornamented in accordance with the present invention, Fig. 2 is a view similar to Fig. 1 showing a modification of the invention, Fig. 3 is a side elevational view of Fig. 1 before the jewels are secured in place, Fig. 4 is a side elevational view of the device shown in Fig. 2, Fig. 5 shows an article of glassware in fragmentary section provided with a recess of a still further modified form for reception of jewels, Fig. 6 shows an article of glassware in fragmentary section illustrating a further modification of the device shown in Fig. 1, Fig. 7 is a view similar to Fig. 6 showing a still further modification, Fig. 8 is a side elevational view of a cut-glass vase ornamented in accordance with the present invention, Fig. 9 is an elevational view similar to Fig. 4, showing a slightly different arrangement of the jewels, and Fig. 10 is a sectional view showing a modified form of jewels and sockets.

In Fig. 1 the glassware article 5 is provided with a recess 6 which, as seen in Fig. 3 is of generally circular form and has a concavo-spherical bottom wall whereby glass jewels 7 of substantially hemispherical or other suitable form may be fastened therein to lie flush with the outer surface of the article 5 when said jewels are of gradually increasing diameters from the center of the recess to the margin thereof. The jewels are secured in place by suitable transparent cement and will have the appearance of integral members which may be of various colors for the desired ornamental effect. When the recess is of circular form the ornamentation may be employed as the center of a suitable flower ornamentation, such as is illustrated at 8 in Fig. 8, but the invention is not restricted to this particular form of recess. The jewels may also slightly project from the recesses.

In Fig. 2 the article 5 is provided with a recess 9 having a convex-spherical bottom wall so that the reverse of the construction shown in Fig. 1 is had in that the jewels will increase in diameter from the center of the recess to the margin thereof, the jewels being denoted by the numeral 7'. In this form of the invention the jewels are fastened in place by the use of transparent cement as described in connection with Fig. 1.

Referring to Fig. 5 the article 5 is provided with a recess 6', the bottom wall of which is of concavo-spherical form and which has a plurality of sockets 10 drilled therein for reception of the jewels. In this form of the invention the jewels will be of such form as to snugly fit in the sockets 10 and the jewels will be retained in these sockets by transparent cement applied to the walls of the sockets. A more permanent fastening is had in this way and, as shown in Fig. 7 the same idea may be carried out with the bottom of the recess flat instead of concavo-spherical form. Obviously, the sockets 10 may also be provided in a convex form such as shown in Fig. 2.

In Fig. 7 the sockets are denoted by the numeral 10′, the recess by the numeral 11, and the jewels by the numeral 12.

In Fig. 6 the jewels 13 will all be of the same diameter for fitting within the recess 14 having a flat bottom as shown, the jewels being flush with the outer surface of the glassware article 5 and being cemented in place as above described with respect to the other forms of the invention. In all of the forms the recess will be formed by grinding or the like and then polishing so that the transparency of the article is not impaired.

In Fig. 8 the present invention is shown also applied to a plurality of variously extending grooves or groove like recesses 15, with the jewels 16 secured in various spaced relation to the bottom walls of the grooves by transparent cement.

It is obvious that various modifications may be made in the construction shown and above particularly described within the principles and scope of my invention.

What I claim as new is:—

1. An article of glassware having a recess formed in the outer surface thereof, a plurality of substantially hemispherical jewels permanently united to the article of glassware within said recess with the flat faces of the jewels contacting the bottom of the recess, the bottom of the recess being of curved cross sectional form, and the jewels being of increasing diameters from the shallower to the deeper portion of the recess with the outer surfaces of the jewels lying flush with the outer surface of the glassware.

2. The method of ornamenting glassware which consists in forming a recess in the outer surface of the glassware, then securing substantially hemispherical jewels in the recess by transparent cement, the jewels being of varying diameters and the bottom wall of the recess being of a form to place the outer portions of the beads flush with the outer surface of the glassware.

3. As an article of glassware having a recess formed in the outer surface thereof, a plurality of jewels permanently united to the article of glassware within the recess with the lower faces of the jewels contacting the bottom of the recess, the bottom of the recess being of curved cross-sectional form, and the jewels being of increasing lengths from the shallower to the deeper portion of the recess with the outer surfaces of the jewels lying flush with the outer surface of the glassware.

4. The method of ornamenting glassware which consists in forming a recess in the outer surface of the glassware, then securing jewels in the recess by transparent cement, the jewels being of varying lengths and the bottom wall of the recess being of a form to place the outer portions of the jewels flush with the outer surface of the glassware.

5. As an article of glassware having a recess formed in the outer surface thereof, a plurality of jewels permanently united to the article of glassware within the recess with the lower faces of the jewels contacting the bottom of the recess, and the bottom of the recess being of curved cross-sectional form.

In testimony whereof I affix my signature.

THOMAS SKINNER.